United States Patent [19]

Farin

[11] 4,431,617
[45] Feb. 14, 1984

[54] METHODS FOR REMOVING MALODOROUS SULFUR COMPOUNDS FROM PULP MILL FLUE GASES AND THE LIKE BY USING GREEN LIQUOR

[76] Inventor: William G. Farin, 707 Elm St., Neenah, Wis. 54956

[21] Appl. No.: 396,743

[22] Filed: Jul. 9, 1982

[51] Int. Cl.$^3$ .............................................. B01D 53/34
[52] U.S. Cl. .................................... 423/232; 423/233; 423/245; 423/DIG. 3; 162/30.1; 162/30.11; 162/36; 162/51
[58] Field of Search ................. 423/232, DIG. 3, 245, 423/233; 162/30.1, 30.11, 36, 51

[56] References Cited

U.S. PATENT DOCUMENTS

| | | | |
|---|---|---|---|
| 439,330 | 10/1890 | Staub | 423/427 |
| 1,945,163 | 1/1934 | Rosenstein | 423/DIG. 3 |
| 3,236,591 | 2/1966 | Groth | 423/DIG. 3 |
| 3,508,863 | 4/1970 | Kiminki et al. | 423/DIG. 3 |
| 3,794,711 | 2/1974 | Bhatia et al. | 423/245 R |
| 3,841,961 | 10/1974 | Saiha | 162/30.1 |
| 4,252,781 | 2/1981 | Fujita et al. | 423/427 |

OTHER PUBLICATIONS

F. H. Garner et al., "The Selective Absorption of Hydrogen Sulfide in Carbonate Solutions", J. Appl. Chem., May 8, 1958, pp. 325-336.

*Primary Examiner*—Edward J. Meros
*Assistant Examiner*—Jackson Leeds

[57] ABSTRACT

An improved method for removing malodorous sulfur compounds from flue gases generated in kraft or sodium sulfite pulping operations and the like by the absorption process using green liquor, an aqueous solution containing sodium sulfide and sodium carbonate. The malodorous gas compounds, including hydrogen sulfide, methyl mercaptan, and dimethyl sulfide are preferentially absorbed by the sodium sulfide forming sodium hydrosulfide and methanol. Any sulfur dioxide in the gas is absorbed and neutralized by sodium carbonate. In this method carbon dioxide absorption is minimized and the formation of sodium bicarbonate is limited. Sodium bicarbonate formation is minimized in order to avoid its reaction with sodium hydrosulfide which would then release undesirable hydrogen sulfide during absorption, as well as to forestall the need to increase chemical and lime kiln capacity requirements when the green liquor returned to the kraft recovery process contains excess amounts of sodium bicarbonate.

12 Claims, 1 Drawing Figure

METHODS FOR REMOVING MALODOROUS SULFUR COMPOUNDS FROM PULP MILL FLUE GASES AND THE LIKE BY USING GREEN LIQUOR

BACKGROUND OF THE INVENTION AND DESCRIPTION OF THE PRIOR ART

In wood pulping which utilizes the kraft and/or sodium sulfite processes, the sulfur compounds in the pulping liquor react to form a number of malodorous organic sulfur compounds as well as hydrogen sulfide and sulfur dioxide. These chemicals are generally in the form of gases and escape to the atmosphere at various stages in the chemical recovery process, particularly in the flue gas from black liquor recovery boilers, from direct contact evaporators, from lime kilns, or from digester and multiple effect evaporator vents.

A substantial amount of the organic sulfur compounds in these gases comprise methyl mercaptan and dimethyl sulfide. Other organic sulfur compounds found in lesser proportion include ethyl sulfide, dimethyl disulfide, isopropyl mercaptan, n-propyl mercaptan and butyl mercaptan. A substantial amount of hydrogen sulfide and sulfur dioxide can also be present in the gases.

In all of these various sulfur compounds, with the exception of sulfur dioxide, the sulfur compounds are formed in the reduction stage of the recovery boiler and will be collectively referred to as total reduced sulfur gases, or TRS, in this specification.

Total reduced sulfur (TRS) gas emissions remain the most serious problem facing the majority of pulp mills when combinations of sodium and sulfur are used as cooking chemicals. The problem is most serious in older kraft mills where sodium sulfide is produced by reduction burning in the recovery boiler and then used in the cooking liquor. In mills using sodium sulfite as the cooking liquor, sodium sulfide is also produced by reduction burning. TRS gas emissions from the recovery boiler can be a problem in sodium sulfite pulping, as well as in liquor processing up to the point where the sulfides are completely removed from the cooking liquor in the recovery system.

If not adequately controlled, up to 21 pounds of TRS gases are released per ton of pulp produced by the kraft pulp mill. Millions of dollars have been spent by many mills without meeting the recommended limits of government regulations. Due to the extremely low threshold odor in parts per billion of the TRS gases released in kraft pulping, an odor problem remains even when these recommended limits for older mills are complied with.

The odor threshold in air for the average human nose for the TRS gas released in parts per billion as compared to sulfur dioxide is shown below:

| | |
|---|---|
| Sulfur Dioxide | 1000–5000 ppb |
| Hydrogen Sulfide | 0.9–8.5 ppb |
| Methyl Mercaptan | 0.6–40.0 ppb |
| Dimethyl Sulfide | 0.1–3.6 ppb |

In kraft pulping, recovery of pulping chemicals following cooking in the digester may be done in various places by a number of processes, including:

1. Pulp washing and spent black liquor collection.
2. Black liquor multiple effect steam evaporation.
3. Black liquor oxidation before and after multiple effect steam evaporation.
4. Black liquor direct contact evaporation with recovery boiler flue gas.
5. Reduction burning of the black liquor in the recovery boiler producing green liquor containing sodium sulfide, sodium carbonate and some sodium hydroxide.
6. Clarification and causticizing the green liquor to white liquor, converting the sodium carbonate to sodium hydroxide and a portion of the sodium sulfide to sodium hydrosulfide. Weak wash liquor is also produced in the causticizing process and contains a high percentage of sodium hydroxide.
7. Lime kiln burning to recover calcium for reuse in causticizing.
8. Cooking the wood chips in a digester with white liquor producing pulp and black liquor.

The TRS gas emissions during kraft pulping may come from the following sources:
Pulp washing vents
Multiple effect steam evaporator vents
Black liquor oxidation
Black liquor direct contact evaporation
Burning the black liquor in the recovery boiler
Green liquor dissolving tank vent
Lime kiln
Digester relief and blow vents
Temperature recovery vents
Tall oil plant vents
Condensate stripper vents Present methods of TRS control include:

1. The use of a very expensive recovery boiler design with limited black liquor burning rates. This method is applicable only to new or replacement installations and is applicable only to the TRS gases released by the recovery boiler.

2. Elimination of the black liquor direct contact evaporator and replacement with a more expensive evaporator using steam. This method adds substantially to the energy requirements and operating costs.

3. Oxidation of the black liquor before and after multiple effect steam evaporation to reduce the emission from the direct contact evaporator. TRS emissions are also encountered from the black liquor oxidation when air is utilized. The oxidation method is high in capital and operating costs.

4. Incineration of TRS gases from concentrated sources with auxiliary fuel forming sulfur dioxide. This method is high in capital and energy costs.

5. Incineration of TRS gases from concentrated sources in the lime kiln to form sulfur dioxide. This method introduces serious hazards due to storage requirements of the digester blow gases and due to the backfires and explosions often encountered in the lime kiln burning. In practice lime kiln operations have often been seriously disrupted due to the inherent operating difficulties. Introduction of The TRS gas into the lime kiln also contributes to a sulfur emission problem.

6. Weak sources of TRS gases are also fed back to the air supply of the recovery boiler or the air supply of the lime kiln for incineration to form sulfur dioxide.

While many of these methods help to reduce the odor threshold problem by burning the TRS gases, they unfortunately may contribute to the nations acid rain problem by producing sulfur dioxide that is vented to the atmosphere.

In a simplified version of chemical recovery of sodium sulfite from spent liquor in sodium sulfite pulping, the green liquor containing sodium sulfide and sodium carbonate is carbonated with carbon dioxide forming sodium bicarbonate and stripping the sulfides as hydrogen sulfide. The hydrogen sulfide is then burned to form sulfur dioxide which is subsequently absorbed by sodium carbonate and/or sodium sulfite to form reconstituted sodium sulfite and/or sodium bisulfite for reuse in cooking. Sodium carbonate can also be causticized to form sodium hydroxide for reuse in cooking.

In the recovery of sodium sulfite, if the conversion of the sodium sulfide to sodium sulfite is complete, the TRS gas emissions are limited to the recovery boiler and green liquor or smelt dissolving tank. If conversion is not complete, TRS gas emission problems are encountered in other locations similar to those encountered in the kraft process. Methods for complete conversion of the sulfides to sulfite were described previously in Farin, U.S. Pat. No. 4,148,684 issued Apr. 10, 1979.

In the initial stages of carbonation in most processes for sodium sulfite recovery, a portion of the recovery boiler flue gas is used for precarbonation of the green liquor.

Examples of precarbonation using a portion of the recovery boiler flue gas are described in the Tampella process, U.S. Pat. No. 3,508,863 to Kimminki et. al., and Sivola method, Finnish Pat. No. 27,478.

In Anderson, U.S. Pat. No. 3,826,710 a portion of the hydrogen sulfide stripped from the green liquor and containing carbon dioxide is used for precarbonation in a countercurrent tower. Absorption of the hydrogen sulfide is obtained in this countercurrent system even though a high percentage of the sodium carbonate contained is carbonated to sodium bicarbonate.

In these prior art applications the purpose of precarbonation by scrubbing the green liquor with the flue gas is to convert the sodium sulfide to sodium hydrosulfide and a portion of the sodium carbonate to sodium bicarbonate. The conversion of sodium sulfide to sodium hydrosulfide occurs by absorbing either carbon dioxide or hydrogen sulfide. The hydrogen sulfide is absorbed near the top of the tower where there is a high percentage of sodium sulfide and a minimum of sodium bicarbonate.

When all the sodium sulfide has been converted to sodium hydrosulfide only carbon dioxide can be absorbed converting the sodium carbonate to sodium bicarbonate. When sodium bicarbonate is formed under these conditions it will react with the sodium hydrosulfide to form sodium carbonate and release hydrogen sulfide.

The purpose of using a portion of the flue gas for precarbonation is to use this source of carbon dioxide to build up the sodium bicarbonate content without causing a hydrogen sulfide emission problem. As the sodium bicarbonate content is increased at the bottom of the precarbonation column it reacts with the sodium hydrosulfide releasing hydrogen sulfide near the bottom of the column. This hydrogen sulfide is reabsorbed by sodium sulfide near the top of the column.

The precarbonation installations are limited to countercurrent towers without recirculation of the green liquor. If the high sodium bicarbonate concentrations formed in the bottom of the column were recycled to the top, large quantities of hydrogen sulfide would be released to the atmosphere, which is undesirable.

Prior to this invention green liquor has not been successfully used as the means for absorption of the sulfides from the kraft recovery boiler. Using present methods of scrubbing the flue gas with green liquor, the green liquor absorbs carbon dioxide and converts sodium carbonate to sodium bicarbonate. Sodium bicarbonate in green liquor is detrimental to kraft recovery as it doubles the causticizing chemical requirements as well as the lime kiln capacity needed over that required for sodium carbonate. In addition the large volume of flue gas generated in black liquor reduction burning requires a large quantity of green liquor for satisfactory contact and absorption. The green liquor quantity is limited by the quantity of sodium sulfide and sodium carbonate produced and the high concentrations needed for conversion to white liquor and cooking in the digester. To provide sufficient contact for TRS absorption recirculation of the green liquor would ordinarily be required. Sodium bicarbonate contained in the bottom of the column and recycled to the top would react with the sodium hydrosulfide and release hydrogen sulfide to the atmosphere.

Prior to this invention the scrubbing liquor ordinarily recommended for TRS absorption from kraft mill flue gas was either white liquor or weak wash liquor from the causticizing process that contained a high percentage of sodium hydroxide. Pure sodium hydroxide solutions have also been recommended. U.S. Pat. No. 3,431,165 Buxton is an example of TRS scrubbing using weak wash liquor. The sodium hydroxide contained in these scrubbing liquors also absorbs the TRS gases forming sodium sulfide. Unfortunately the sodium hydroxide in these liquors that has been converted from sodium carbonate to sodium hydroxide by the expensive causticizing process is carbonated back to sodium carbonate and to sodium bicarbonate by the absorption of carbon dioxide. It then requires recausticizing of the sodium carbonate and sodium bicarbonate back to sodium hydroxide for use as white liquor. This adds substantially to the causticizing equipment requirements and causticizing costs.

The white liquor or weak wash containing a high percentage of sodium hydroxide along with sodium sulfide and sodium carbonate can be used for TRS absorption in accordance with this invention. Green liquor may also contain a minimum of sodium hydroxide in kraft and alkaline sodium sulfite pulping applications. The sodium hydroxide content aids in the absorption of TRS gases but is not essential for TRS absorption in accordance with this invention. The use of green liquor is preferred as it contains a minimum of sodium hydroxide and thereby minimizes recausticizing costs. When the sodium hydroxide is allowed to carbonate to sodium bicarbonate, the reaction with sodium hydrosulfide releasing hydrogen sulfide is also encountered thereby decreasing the TRS scrubbing efficiency.

It is the purpose of this invention to provide an economical method for absorption of total reduced sulfur (TRS) gases from the recovery boiler, direct contact evaporator, lime kiln and other concentrated sources using liquor containing sodium sulfide and sodium carbonate by limiting the formation of sodium bicarbonate. It is also the purpose of this invention to limit the formation of sodium bicarbonate to permit recirculation of the green liquor and improve absorption efficiency. Another purpose of this invention is to provide economical methods for absorption of the sulfur dioxide formed in the pulping process and by the oxidation of the TRS gases.

SUMMARY OF INVENTION

This invention is directed to an improved method for removing malodorous sulfur compounds from flue gases generated in particular during kraft or sodium sulfite pulping operations, by utilizing green liquor to scrub and react with the flue gases. Green liquor, which is well known in the pulping art, comprises an aqueous solution containing primarily sodium sulfide and sodium carbonate formed during reduction burning of black or spent liquor from the kraft or sodium sulfite pulping operation. In kraft and alkaline sulfite pulping it can also contain some sodium hydroxide.

In the method of this invention, hot flue gas from a recovery boiler used for direct contact evaporation of black liquor may be first passed at relatively high velocity through a spray of green liquor. Water is evaporated frpm the green liquor and the flue gas is cooled to near saturation temperature. The flue gas is then passed through a separation chamber, where the green liquor entrained in the gas during spraying is collected, and into the bottom of a packed absorption tower. The flue gas is then passed upwardly through the packing and is scrubbed counter currently by counterflowing green liquor which absorbs the TRS gases. The scrubbed flue gas is then passed upwardly through a demister to remove green liquor entrained during the scrubbing operation and is discharged to the atmosphere substantially free of sulfur compounds.

The green liquor supplied to the tower may be mixed with recirculated green liquor before being introduced into the top of the packed absorber and passed downwardly through the packing, countercurrent to the flue gas. A portion of this green liquor after the scrubbing operation, is used to cool the inlet flue gas and is simultaneously concentrated by evaporation. It is then returned to the chemical recovery system of the pulping process.

In the absorption and recovery of the TRS gases and sulfur dioxide in accordance with this invention, wherein green liquor is used for scrubbing, the TRS gases are absorbed rapidly by the sodium sulfide in the liquor according to the following reactions to form sodium hydrosulfide and methanol:

For Hydrogen Sulfide: $H_2S + Na_2S = 2NaHS$

For Methyl Mercaptain:
$CH_3SH + Na_2S + H_2O = 2NaHS + CH_3OH$

For Dimethyl Sulfide:
$CH_3SCH_3 + Na_2S + H_2O = 2NaHS + 2CH_3OH$

The methanol is relatively innocuous and dissipates rapidly with no undesirable effects.

Any sulfur dioxide contained in the gas mixture is also absorbed rapidly by the sodium carbonate in accordance with the following reaction:

$SO_2 + Na_2CO_3 = Na_2SO_3 + CO_2$

Carbon dioxide in the flue gas is absorbed stepwise by much slower reactions forming sodium bicarbonate which reacts with sodium sulfide to form sodium hydrosulfide and sodium carbonate. Sodium bicarbonate will also react with contained sodium hydroxide to form sodium carbonate. The following are typical reactions:

$H_2O + CO_2 = H_2CO_3$ $H_2CO_3 + Na_2CO_3 = 2NaHCO_3$ $NaHCO_3 + Na_2S = NaHS + Na_2CO_3$ $NaHCO_3 + NaOH = Na_2CO_3 + H_2O$

If all the sodium sulfide and sodium hydroxide are consumed and if the sodium bicarbonate content in the solution is allowed to build up, it will react with the sodium hydrosulfide and release hydrogen sulfide as follows:

$NaHCO_3 + NaHS = Na_2CO_3 + H_2S$

This phenomenon is the reason prior art scrubbing of flue gas with green liquor for the absorption of TRS gases has not been successful. Recirculation of the green liquor for absorption of the TRS gases is ordinarily required to provide sufficient contact between the limited volume of green liquor solution available and the relatively large quantity of flue gas generated. Recycled green liquor containing sodium hydrosulfide and an excess of sodium bicarbonate will release rather than absorb hydrogen sulfide.

The presence of excess sodium bicarbonate is also detrimental in kraft green liquor due to the increased chemical requirements for causticizing and the added capacity requirements of the lime kiln. It is desireable therefore to minimize the formation of sodium bicarbonate.

If the absorption of carbon dioxide by the green liquor is limited, the formation of sodium bicarbonate is likewise limited, and the sodium bicarbonate formed will be reacted with sodium sulfide and/or sodium hydroxide. This prevents the buildup of sodium bicarbonate in the green liquor and the reaction with sodium hydrosulfide that releases hydrogen sulfide. Recirculation of this green liquor, low in sodium bicarbonate content, can then be made without causing a release of hydrogen sulfide to the atmosphere.

The process of this invention limits the absorption of carbon dioxide and formation of sodium bicarbonate so that the sodium bicarbonate formed is reacted with sodium sulfide and/or sodium hydroxide by one or more of the following methods:

1. INCREASED GAS VELOCITY. Due to the slow absorption rate of carbon dioxide, most absorption towers require low gas velocities in the range under 100 feet per minute. As gas velocities increase the carbon dioxide absorption rate is substantially reduced. Depending on other conditions in the absorber, carbon dioxide absorption can be sufficiently reduced by increasing the gas velocity to 250 foot per minute. Such velocity will provide the desired minimum carbon dioxide absorption requirements of this invention. Higher velocities in the range of 400 feet per minute can minimize absorption further, even when other conditions, described later, favor carbon dioxide absorption. Velocities above 400 feet per minute and up to 1,500 feet per minute can also be used but are restricted by the higher pressure drops encountered, and increase power requirements. To minimize pressure drop and allow high flue gas velocities an open type packing is preferred. Packing suppliers designate packing pressure drop characteristics by an Eckert packing factor ($F_p$) determined experimentally. The Eckert packing factor is described by Perry & Chilton, Chemical Engineering Handbook, p 18–22, 5th Edition (1973) and by Eckert, Chemical Engineering Progress, 66(3), 39(1970). For the purpose of this invention an Eckert packing factor ($F_p$)=40 or under is recommended. Eckert packing factors are ordinarily above ($F_p$)=5.

2. HIGHER ABSORPTION TEMPERATURES. Carbon dioxide absorption is most favorable at scrubbing temperatures below 40° C. At scrubbing temperatures above 60° C. absorption rates for carbon dioxide are substantially reduced with relatively little effect on the absorption of the sulfides. Above 100° C. scaling on the packing can be encountered. Scrubbing temperatures in the 60° C. to 100° C. range are recommended to minimize carbon dioxide absorption and avoid scaling problems.

3. SHORTER RETENTION TIME FOR SCRUBBING SOLUTION. The absorption of carbon dioxide requires a long liquid retention or passage time of the aqueous scrubbing solution for absorption. Towers with trays designed for liquid retention are ordinarily used for carbon dioxide absorption to provide this desired liquid retention time. One means of minimizing carbon dioxide absorption and the formation of sodium bicarbonate is by limiting the liquid passage time of the aqueous scrubbing solution through the absorber to the 10 second to 120 second range.

4. LOWER PACKING HEIGHT. When packed towers are used for carbon dioxide absorption and the formation of sodium bicarbonate, very high or multiple towers are required. The absorption of the TRS requires less packing height and depends on the degree of TRS removal required. Limiting the packing height to the range of 3 feet to 16 feet is recommended to reduce carbon dioxide absorption and limit the formation of sodium bicarbonate.

5. REDUCED RECIRCULATION. To provide the contact needed for adequate TRS removal and limit the quantity of green liquor used, some recirculation of the green liquor is ordinarily required. The quantity of recirculation required will depend on the degree of TRS absorption required, the amount of green liquor available and the pressure drop restrictions based on gas velocities, the packing selected and the packing height. To minimize carbon dioxide absorption and the formation of sodium bicarbonate the recirculation should be kept to a minimum and held in the range of 1,000 to 15,000 pounds of liquor recirculation per square foot of the cross sectional area of the packing perpendicular to the direction of the flue gas flow.

6. MIXING RECIRCULATED GREEN LIQUOR WITH ORIGINAL SUPPLY. Thorough mixing is recommended between the green liquor circulated back to the absorber and the green liquor supply by running the combined flows through the circulating pump or a mixer. This mixing causes any sodium bicarbonate contained in the circulated green liquor to react with the sodium sulfide and/or sodium hydroxide contained in the green liquor supply. The sodium bicarbonate in the recirculated portion is thereby consumed before being reused for scrubbing. This precaution prevents the reaction of sodium bicarbonate and sodium hydrosulfide that would release undesirable hydrogen sulfide at the top of the tower.

8. MAINTAINING HIGH pH. The pH of the green liquor supplied to the absorber is controlled in the 10.7 to 13.0 range by controlling the green liquor feed rate to the absorption system. This allows a limited amount of green liquor to be used and provides means of handling surges of TRS content from sources such as a batch digester blow. A surge of TRS gases will lower the pH of the circulating liquor and requires an increase in green liquor supply in order to absorb the additional TRS gases.

9. DIRECT CONTACT EVAPORATION OF GREEN LIQUOR. Direct contact evaporation of the green liquor may also be provided following its use for absorption. This permits a lower concentration of green liquor to be used for absorption. This also increases the volume of the green liquor used for scrubbing and reduces the ratio of circulated liquor to supply liquor. By cooling the flue gas below 100° C., scaling problems in the packing are avoided.

The conversion of sodium sulfide to sodium hydrosulfide that occurs in the TRS absorber also occurs in both the kraft and sodium sulfite recovery systems. The green liquor from the TRS absorber can be causticized for use in kraft recovery or carbonated for use in sodium sulfite recovery.

In this invention the absorption of carbon dioxide and formation of sodium bicarbonate during TRS absorption is limited to a point where most of the sodium bicarbonate formed will be consumed by reaction with sodium sulfide and/or contained sodium hydroxide. Some sodium sulfide can remain in the discharged green liquor. Under the prescribed conditions there is little or no sodium bicarbonate available in the green liquor circulated to the top of the tower. This minimizes the possibility of a reaction with sodium hydrosulfide and the undesirable release of hydrogen sulfide.

The amount of green liquor used in each absorption tower can be limited by the pH control so that sufficient green liquor is available for TRS absorption at various locations in the kraft mill. It can be used for TRS absorption of the recovery boiler flue gas after it has been used for direct contact evaporation. It can be used for TRS absorption of the flue gas from the lime kiln. Other concentrated sources of TRS gases such as the digester blow, green liquor dissolving tank, evaporator, and turpentine recovery can be combined with gases sent to TRS scrubbing from the recovery boiler, lime kiln or to a separate TRS absorber. In most conventional pulp mill systems there is substantially more sodium sulfide available for TRS absorption than needed for all sources of TRS if the absorption of carbon dioxide is adequately controlled.

When sulfides are absorbed in the TRS absorber, it eliminates the need for combustion of the sulfides forming sulfur dioxide, the subsequent release of sulfur dioxide to the atmosphere, and an undesirable addition to the acid rain problem. The TRS absorber can also handle the surges from digester blows eliminating the need for storage of these explosive gases and the hazards involved in their combustion.

The sources of TRS gases that are low in concentration can still be vented into the air supply to the recovery boiler or lime kiln for combustion. The sulfur dioxide formed by this combustion will be absorbed in the TRS absorber. The need for black liquor oxidation and this source of TRS gas emission can be eliminated.

Additional advantages will become apparent to persons skilled in the art on referring to the following detailed specifications and accompanying drawing.

DETAILED DESCRIPTION OF THE PREFERRED EMBODIMENTS

Figure 1:
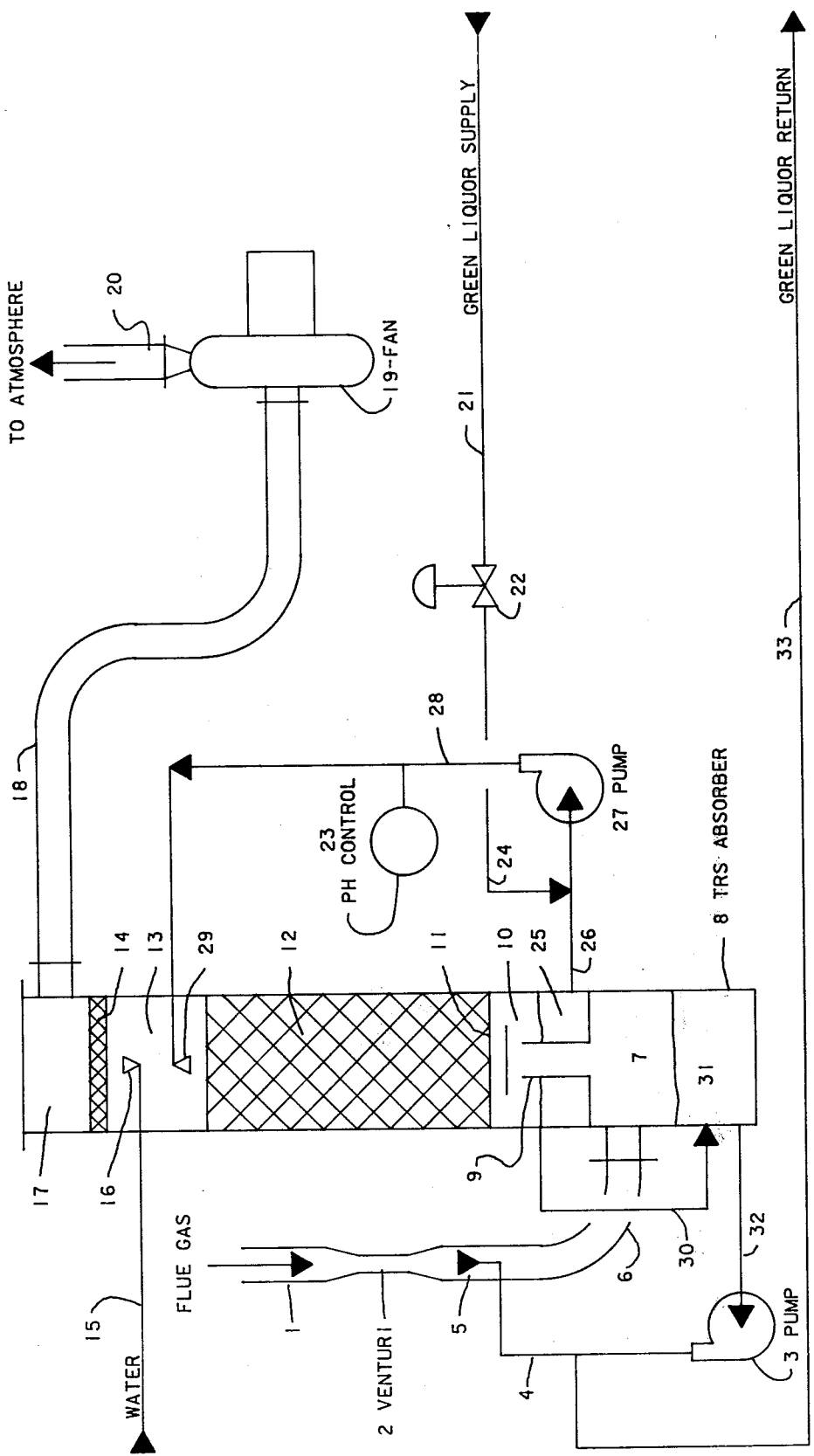
FIG. 1 is a schematic flow diagram of a TRS absorber using green liquor for absorption with direct contact evaporation and preferrential absorption of TRS gases while minimizing carbon dioxide absorption in accordance with this invention.

The arrangement shown in FIG. 1 is exemplary of a system suitable for a 500 oven dry ton per day kraft pulp mill. The flue gas in this system comes from the recovery boiler after being used for black liquor direct contact evaporation and enters through duct 1. Other sources of flue gas are, of course, contemplated. For this size operation the flue gas is supplied at about 413,400 pounds per hour at 150° C. and contains approximately 167 pounds per hour of TRS gas including hydrogen sulfide, methyl mercaptan and dimethyl sulfide. It also contains about 20 pounds per hour of sulfur dioxide.

The flue gas passes through a low pressure drop venturi section 2 where flue gas velocities of 6,000 to 10,000 feet per minute are obtained. At the discharge end of the venturi section a high velocity spray of green liquor is provided by pump 3 through line 4 and spray nozzle 5 at about 625 gallons per minute (GPM) directed into the venturi section counter current to the flue gas flow. The incoming flue gas, which has a temperature of about 150° C. is cooled by the sprayed liquor to a saturation temperature of about 75° C. approximately 8,940 pounds per hour of water are evaporated from the green liquor. For subsequent scrubbing it is desirable that the flue gas temperature be within about the 60° C. to 100° C. range. The flue gas and entrained green liquor are discharged through line 6 into separation chamber 7 in the lower section of TRS absorber 8.

The flue gas then passes upward through standpipe 9 into chamber 10, through perforated packing support plate 11 to packing chamber 12 filled with ceramic packing. The packing chamber is sized for flue gas velocities of about 400 feet per minute (fpm). Sizes which permit velocities of from 250 fpm to 1500 fpm are suitable. The flue gas then passes through open space 13 and through demister 14 to remove entrained liquor and into upper chamber 17. The lower side of demister 14 is washed with water supplied by line 15 and distributed by spray nozzle 16. The cleansed flue gas is then pulled from top chamber 17, through line 18 by fan 19 and discharged through line 20 to the atmosphere.

The green liquor is supplied through line 21 at about 251,500 pounds per hour and 407 GPM at 90° C. and contains approximately 24,900 pounds per hour of sodium carbonate and 5,900 pounds per hour of sodium sulfide. The flow rate is controlled by valve 22 regulated by pH control 23 holding the pH within the range of 10.7 to 13. The green liquor supply passes through line 24 and joins circulating green liquor from chamber 25 as it passes through line 26. The combined liquors are mixed and circulated by pump 27. The liquor is circulated at about 1,530,000 pounds per hour and 2,450 GPM through line 28 and distribution nozzle 29 to the top of packing chamber 12. This provides a liquor distribution rate to the packing of about 5,000 pounds per square foot. By selecting 3" ceramic saddle packing with an Eckert packing factor $F_p=22$ and a packing height of 12 feet the pressure drop of the flue gas is limited to 2.2 inches of water and the liquor passage time held to less than 60 seconds.

Liquor passage holdup times of 10 to 120 seconds, packing heights in the 3 to 16 foot range and liquor distribution rates in the 1,000 to 15,000 pounds per square foot range of the area perpendicular to the direction of flue gas flow are recommended.

In the packing chamber, the sodium sulfide in the green liquor selectively absorbs the hydrogen sulfide, methyl mercaptan and dimethyl sulfide and in the flue gas to form sodium hydrosulfide and methanol. The latter rapidly and harmlessly dissipates. Sulfur dioxide is absorbed by the sodium carbonate. Carbon dioxide absorption is limited by the above defined operating conditions selected for the absorber, minimizing the formation of sodium bicarbonate. The limited amounts of sodium bicarbonate formed are consumed by reacting with sodium sulfide and/or contained sodium hydroxide and producing sodium hydrosulfide and sodium carbonate.

The circulated liquor drops through the perforated support plate 11 to holdup chamber 25 for recirculation and overflows through line 30 to holdup chamber 31. The recirculated green liquor in chamber 31 is then discharged through line 32 by pump 3 with a portion passing through line 4 for flue gas cooling by water evaporation from the green liquor. The balance is discharged through line 33 back to the chemical recovery system.

The arrangement shown in FIG. 1 can also be used to scrub the flue gas from the lime kiln or any combination of other sources of TRS. The use of green liquor for absorption does not increase pulping costs and provides a savings of the sulfur ordinarily lost by emission to the atmosphere of the TRS gases.

A variety of equipment may be utilized in the methods defined in this invention. The absorption tower may be a spray tower without packing, a tray tower or a packed tower with a wide variety of packing utilized. White liquor or wash liquor containing a high percentage of sodium hydroxide can be substituted for green liquor or used in combination with green liquor to facilitate absorption.

While specific embodiments of the invention concept and operating conditions and temperatures are set forth herein, it is understood that the invention is not construed as limited thereby and that suitable modifications and variations may be made without departing from the spirit and scope of the invention as defined in the appended claims.

What I claim is:

1. An improved method of removing malodorous organic sulfur compounds and hydrogen sulfide from flue gases containing carbon dioxide by scrubbing said flue gases with an aqueous scrubbing solution containing sodium sulfide and sodium carbonate, wherein said flue gases are counterflowed through and contacted with said scrubbing solution at a velocity of at least 250 feet per minute, wherein said the scrubbing temperature is maintained in the 60° C. to 100° C. range, and wherein the pH of said scrubbing solution is maintained in the 10.7 to 13 range, whereby carbon dioxide absorption and the resulting formation of sodium bicarbonate in the said scrubbing solution is minimized.

2. The method of claim 1, wherein said flue gases are counterflowed through said scrubbing solution at velocities between 250 and 1500 feet per minute.

3. The method of claim 1 wherein the pH is maintained by regulating the feed rate of said scrubbing solution.

4. The method of claim 1, wherein a portion of said scrubbing solution after contact with said flue gas is recirculated and intermixed with a makeup scrubbing solution for use as said scrubbing solution.

5. The method of claim 4, wherein the flow rate of said scrubbing solution is between 1,000 and 15,000 pounds per square foot of the cross sectional containment area of said flue gas that is perpendicular to the direction of flow of said flue gases.

6. The method of claim 1, wherein a portion of said scrubbing solution after contact with said flue gases is sprayed in counterflow to said flue gases to provide direct contact evaporation of said portion and cooling of said flue gases before said flue gases are counterflowed through and contacted by said scrubbing solution.

7. The method of claim 1, wherein contact between said flue gases and said scrubbing solution are facilitated by passage through a column of packing material.

8. The method of claim 2 wherein said packing has an Eckert packing factor of 40 or under.

9. The method of claim 2 wherein the height of said packing material is from 3 to 16 feet.

10. An improved method of removing malodorous organic sulfur compounds and hydrogen sulfide from flue gases containing carbon dioxide by utilizing an aqueous scrubbing solution containing sodium sulfide and sodium carbonate wherein said scrubbing solution is counterflowed through said flue gases at a rate that provides a contact passage time of said scrubbing solution from about 10 seconds to 120 seconds, wherein the scrubbing temperature is maintained in the 60° C. to 100° C. range, and the pH of said scrubbing solution is maintained in the 10.7 to 13 range, whereby carbon dioxide absorption and the resulting formation of sodium bicarbonate in said scrubbing solution is minimized.

11. The method of claim 10, wherein a portion of said scrubbing solution after contact with said flue gases is recirculated and intermixed with a makeup scrubbing solution for use as said scrubbing solution.

12. The method of claim 11, wherein the flow rate of said scrubbing solution is between 1,000 and 15,000 pounds per square foot of cross sectional containment area of said flue gases that is perpendicular to the direction of flow of said flue gases.

* * * * *